US 8,370,681 B2

(12) United States Patent
Hanes (10) Patent No.: US 8,370,681 B2
(45) Date of Patent: Feb. 5, 2013

(54) REMOTE BACKUP STORAGE (75) Inventor: David H. Hanes, Loveland, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 414 days.

(21) Appl. No.: 12/477,414

(22) Filed: Jun. 3, 2009

(65) Prior Publication Data
US 2010/0313066 A1 Dec. 9, 2010

(51) Int. Cl.
G06F 11/00 (2006.01)
(52) U.S. Cl. .......................... 714/6.3; 714/57
(58) Field of Classification Search .......... 714/42, 714/54, 57, 6.3, 6.31, 6.32
See application file for complete search history.

(56) References Cited

U.S. PATENT DOCUMENTS

| | | | |
|---|---|---|---|
| 5,835,953 A | 11/1998 | Ohran | |
| 5,901,228 A * | 5/1999 | Crawford | 705/34 |
| 6,041,346 A | 3/2000 | Chen et al. | |
| 6,269,431 B1 * | 7/2001 | Dunham | 711/162 |
| 6,351,776 B1 * | 2/2002 | O'Brien et al. | 709/245 |
| 6,594,677 B2 * | 7/2003 | Davis et al. | 1/1 |
| 7,117,314 B2 * | 10/2006 | Kanda et al. | 711/147 |
| 7,765,440 B2 * | 7/2010 | Zimmer et al. | 714/57 |
| 2002/0029319 A1 * | 3/2002 | Robbins et al. | 711/114 |
| 2005/0114464 A1 * | 5/2005 | Amir et al. | 709/213 |
| 2006/0150036 A1 * | 7/2006 | Pierce et al. | 714/57 |
| 2008/0034019 A1 * | 2/2008 | Cisler et al. | 707/204 |
| 2008/0034039 A1 | 2/2008 | Cisler et al. | |
| 2009/0164853 A1 * | 6/2009 | Gokhale et al. | 714/57 |
| 2010/0210240 A1 * | 8/2010 | Mahaffey et al. | 455/411 |

OTHER PUBLICATIONS

Carbonite; Overview of How Carbonite Works; Founded 2005.*
IBM Reliable Scalable Cluster Technology for AIX 5L Managing Shared Disks; Third Edition; Nov. 2005 pp. 1-114.*
Satran et al.; Network Working Group; Internet Small Computer Systems Interface (iSCSI), Apr. 2004, pp. 1-237.*
Breuer et al.; The Network Block Device; Linux Journal; May 1, 2000; pp. 1-5.*
Wikipedia, The Free Encyclopedia, "Time Machine (Apple Software)" last updated May 7, 2009, http://en.wikipedia.org/wiki/Time_Machine_(Apple_software), pp. 1-3.
Apple, Inc., "Time Machine. A giant leap backward", copyright 2009, http://www.apple.com/macosx/features/timemachine.html, pp. 1-2.

* cited by examiner

Primary Examiner — Joshua Lohn (57) ABSTRACT

Systems, methods, and other embodiments associated with a backup utility are described. One example system causes a backup utility to identify a remote device as local to a client device. Backup data may then be retained on the remote device identified by the backup utility as being local.

14 Claims, 4 Drawing Sheets

REMOTE BACKUP STORAGE

BACKGROUND

Computers have become an important part of society. Computers are used for business applications, personal applications, entertainment, communication, and so on. While computers can be relatively reliable, there can be instances when computers encounter errors and suffer failures. Due to computer importance, computer errors and failures can be devastating and cause information to be lost. In one illustrative instance, different viruses and/or errors can cause a variety of problems for a computer. To combat these problems, backup programs enable copies of the computer's hard drive to be periodically saved. If a problem is encountered, then the computer can be rolled back to a previous state by using a saved copy. Thus, a backup program can be used to counter at least some computer problems.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Prior to discussing the present embodiments, consider the following example. A backup utility retains information and uses the retained information to return a computer (or selected files) to a previous state when appropriate. In one example, the backup utility can function to save backup information locally but does not provide an option to store data remotely (e.g., Apple's Time Machine). However, there can be instances where it is desirable to retain information associated with a computer backup at a remote storage location.

Aspects disclosed herein allow for backup information to be retained remotely in situations when the backup utility does not allow remote storage. In one embodiment, a remote storage device may be represented as a local storage device to a backup utility that does not provide a remote storage option. In other words, the identity of the remote storage device is disguised or changed to look like a local device. The representation causes the backup utility to function under a belief that the backup utility communicates with a local storage device while actually communicating with the remote storage device. In one sense, the changed representation allows the backup utility to function with a remote device without having to modify the programming of the backup utility. Backup information may then be retained remotely. Therefore, a remote storage option can be provided to a backup utility that does not include such an option.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit; CD: compact disk; CD-R: CD recordable; CD-RW: CD rewriteable; DVD: digital versatile disk and/or digital video disk; RAM: random access memory; ROM: read only memory.

"Computer-readable medium", as used herein, refers to a storage medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other tangible media from which a computer, a processor or other electronic device can read.

"Logic", as used herein, includes but is not limited to hardware, firmware, software stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations include physical manipulations of physical quantities. Usually, though not necessarily, the physical quantities take the form of electrical or magnetic signals capable of being stored, transferred, combined, compared, and otherwise manipulated in a logic, and so on. The physical manipulations transform electronic components and/or data from one state to another.

Figure 1:
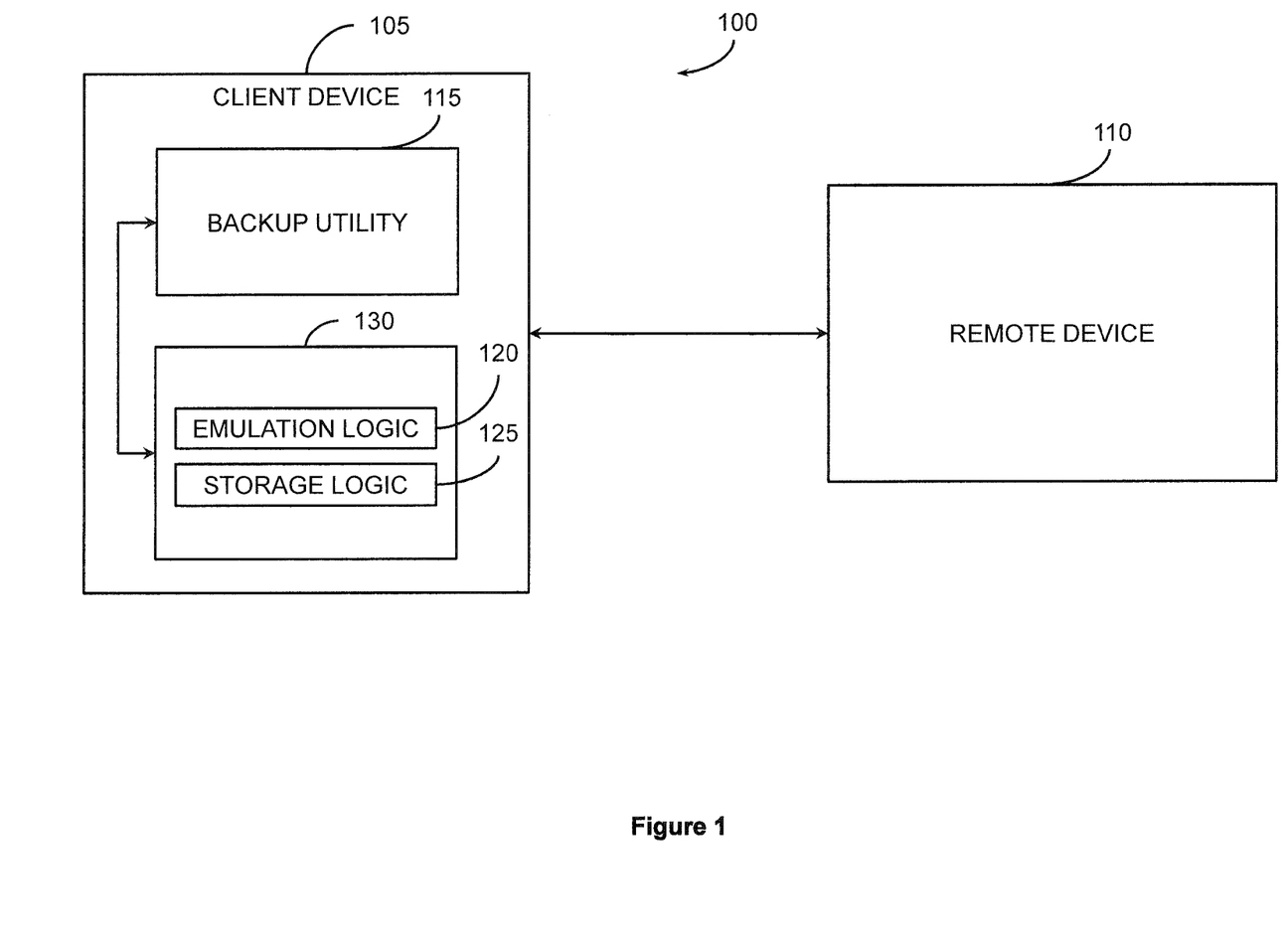
FIG. 1 illustrates one embodiment of a system associated with representing a remote device as a local device to a backup utility.

FIG. 1 illustrates one embodiment of a network 100 used in remote storage of backup information. The network 100 includes at least a client device 105 and a remote device 110. An example client device 105 is a personal computer while an example remote device 110 is a server. The client device 105 hosts a backup utility 115. The backup utility 115 includes a function to create a copy of a hard drive of the client device 105. Another function may be to make copies of changes to the hard drive in subsequent backup operations. The subsequent backups may be performed when a change is made to the hard drive and may be performed automatically. Therefore, different versions of the hard drive can be available to a user of the client device 105.

In some situations, the hard drive may need to be restored to a previous state. The backup utility 115 may include functions to allow the user to view representations of previous versions of the hard drive and select a previous version for restoration. A user interface can be employed by the backup utility to communicate with the user and allow the user to select a previous version or state based on backup information. The selected previous version or state can be used to rollback the hard drive to an earlier edition or rollback selected files or data.

In one embodiment, the backup utility 115 retains backup information locally. However, at least some backup utilities are restricted in that they do not allow remote storage of backup information. Therefore, a system 130 is provided that tricks the backup utility 115 into believing that a storage device is local when the storage device is actually remote.

According to one embodiment, the system 130 comprises emulation logic 120 and storage logic 125. The emulation logic 120 is configured to fool the backup utility 115 into believing the remote device 110 is actually local to the client device 105. For example, the emulation logic 120 causes the backup utility 115 to identify the remote device 110 as local to the client device 105. Causing the backup utility 115 to perform this identification causes the backup utility 115 to use the remote device 110 to save backup data without modifying the programmed operation of the backup utility 115. In one embodiment, the emulation logic 120 may be implemented in a computer-readable storage medium and implemented in a manner similar to a device driver.

The storage logic 125 is configured to assist in storing the backup data. The storage logic 125 may be implemented in a computer-readable medium. Additionally, the storage logic 125 is configured to cause the backup data to be retained on the remote device 110 identified by the backup utility 115 as being local. Causing the backup data to be retained can be in response to an instruction from the backup utility 115 to retain the backup data. According to one embodiment, the remote device 110 has a portion allotted for backup utility storage (e.g., 128 gigabytes or other size). For example, the allocation can be designated by a user and the storage logic 125 can cause storage of backup data in the allotted portion.

Figure 2A:
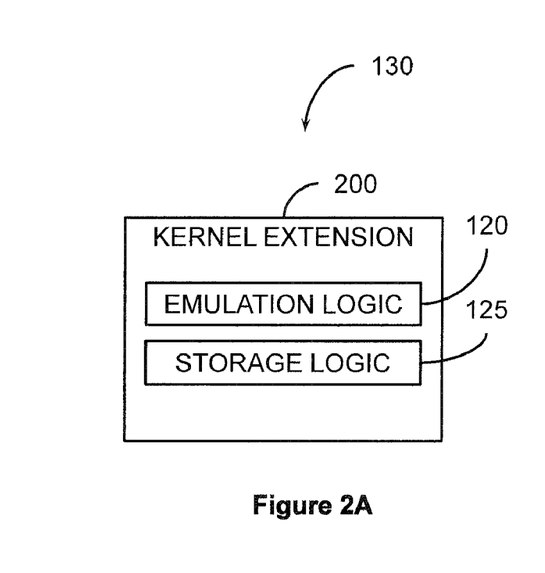
FIG. 2A illustrates one embodiment of a kernel extension.

With reference to FIG. 2A, another embodiment of system 130 is shown. The system 130, including the emulation logic 120 and storage logic 125, are implemented as part of a kernel extension 200. The kernel extension 200 can be part of a software kernel as well as be an independent unit that leverages off an existing software kernel. By being part of a kernel extension 200, the emulation logic 120 and/or storage logic 125 can be implemented on new backup utilities as well as be implemented after market.

Figure 2B:
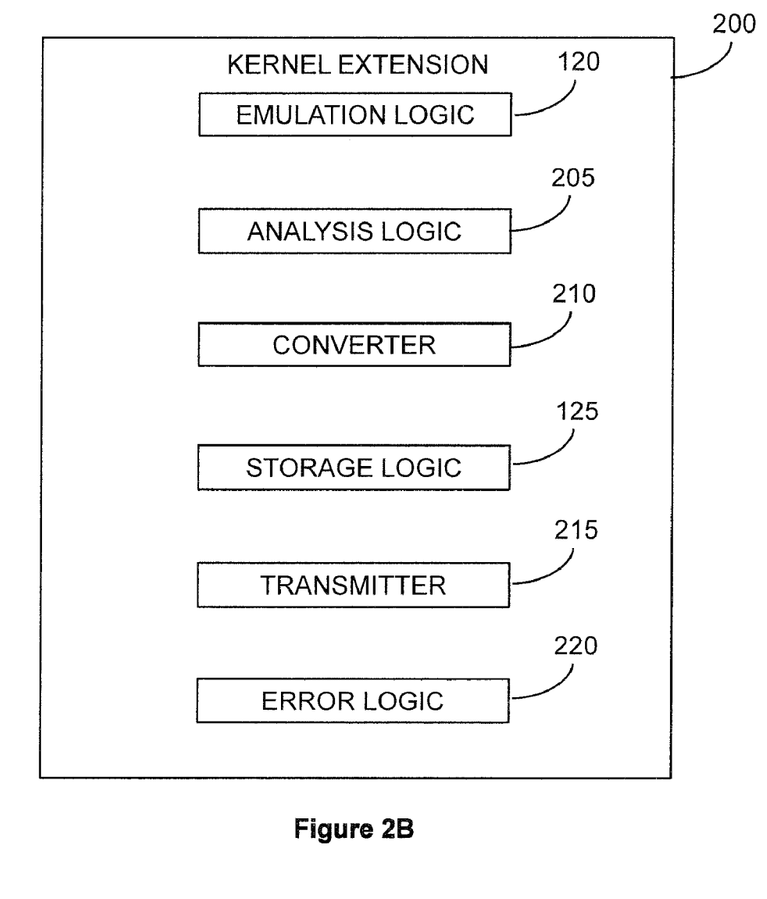
FIG. 2B illustrates another embodiment of a kernel extension.

FIG. 2B illustrates another embodiment of the kernel extension 200. The kernel extension 200 is installed to leverage off an existing kernel and operate as part of a client device operating system. In alternative embodiments, the kernel extension 200 is part of an originally installed software kernel or installed as part of a download. In one embodiment, the kernel extension 200 can include emulation logic 120 that represents to a backup utility that a remote storage device is a local device as previously described. In one example, the remote device is represented as a virtual block device. Therefore, the backup utility thinks the storage device is physically attached to the client device that is executing the backup utility. When a backup operation is ready to execute, the backup utility can send an instruction (e.g., read/write request) to retain the backup data and the kernel associated with the kernel extension 200 processes the instruction.

To process instructions from the backup utility, the kernel extension 200 may include analysis logic 205 that accesses and analyzes the instruction. For instance, the instruction can request that backup data be retained in a selected location. As previously described, the backup utility only provides for local storage thus the selected location appears as a local storage device. However, in this case, the device is actually the remote device, which is identified as a local device. The analysis logic 205 is implemented in a computer-readable medium and configured to process the instruction from the backup utility to retain the backup data. Example backup data may include an image of the hard drive, selected backup data from the hard drive, a copy of changes made to the hard drive, metadata pertaining to when a change is made to the hard drive, and others.

In one embodiment, the backup data can be in a format consistent with a client device. For example, the backup data is formatted in accordance with a particular operating system. In some configurations, the client device and remote device may have different operating systems and thus different formats for data. In such a case, the backup data may be reformatted for the remote device and then saved remotely.

In one example, the kernel extension 200 includes a converter 210 that translates the backup data from a format used for storage at the client device 105 to a format used for storage at the remote device 110 (see FIG. 1). For example, the converter 210 is configured to modify the backup data from a logical block address format to a file offset format as at least part of the translation. When a rollback occurs, the converter 210 translates the backup data from the remote device format to the local device format. With the converter 210, it is possible to accept Command Descriptor Block (CDB) commands encapsulated in a USB (Universal Serial Bus) protocol. CDB can include operation code, logical block address, and transfer length. The operation code defines a request being made by the backup utility (e.g. read, write, etc). Also, the logical block address can be converted into a starting file offset (e.g., based on fixed block size reported by USB emulation code).

For storing the backup data, storage logic 125 causes the remote storage device to retain the backup data (or translated data if translated by the converter 210). In one embodiment, a process result of the analysis logic 205 can be used to control operation of the storage logic 125. In one example where the backup data is not reformatted/translated, the storage logic 125 causes the backup data to embed in a file system of the remote device while the backup data retains the format of the client device. Since there is not actual translation of the data, access and storage speed can be improved. In one embodiment, the storage logic 125 can use a Server Message Block protocol to store and/or retrieve data from a file(s) on the remote device. The storage logic 125 can use a transmitter 215 to send the backup data. While shown as part of the kernel extension 200, the transmitter 215 can be an external component like a hardware transmitter with an antenna as well as other embodiments.

It is possible for errors to occur before or during backup data retention. For example, the system may not be able to transmit information to the remote storage device (e.g. network connection lost, remote device not operating, and so on). Therefore, the kernel extension 200 can include error logic 220 for managing errors related to remote storage of backup data. For example, the error logic 220 can attempt to correct errors and send error messages to the backup utility that are consistent with a local storage device (e.g. network error messages are reformatted to look like local error messages). In this manner, the backup utility does not receive conflicting signals such as receiving network error messages for what it believes is a local device. It is to be appreciated that while the converter 210, transmitter 215, and various logics are included in the kernel extension 200, the converter 210, transmitter 215, and various logics can be implemented as components separate from the kernel extension 200.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 3:
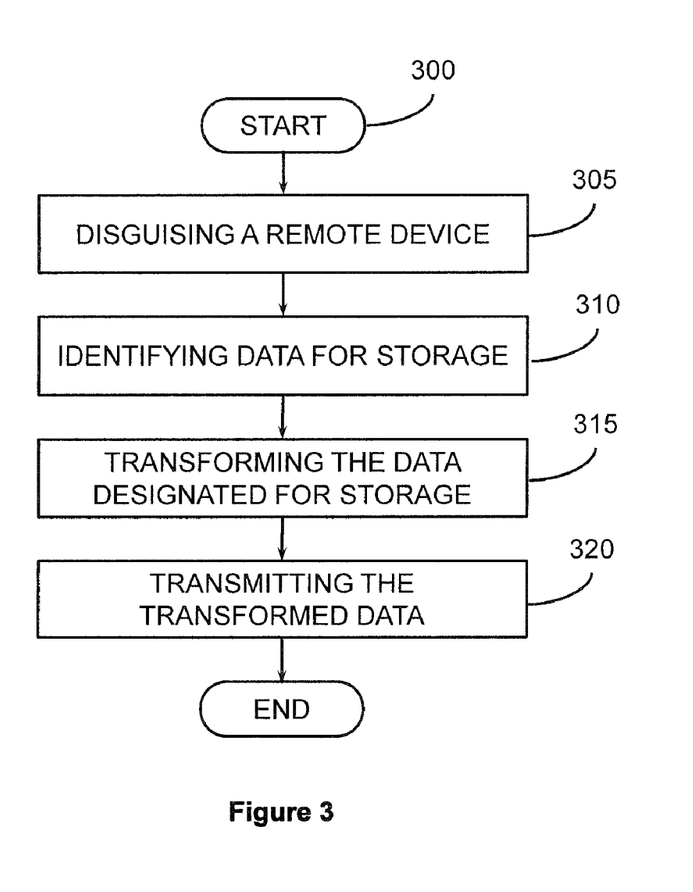
FIG. 3 illustrates one embodiment of a remote device representation methodology.

FIG. 3 illustrates an embodiment of a methodology 300 for causing storage of backup information at a remote device when the backup utility does not provide or allow remote storage. At block 305, the method includes disguising the remote device as a local device to a client device. The disguising can include causing the backup utility to identify the remote device as a device local to the client device. The disguising allows the backup utility to perform a remote backup operation without modifying its programming. An example representation can include notifying the backup utility that a remote device is a USB connected device or other locally connected device. In one embodiment, the disguising is performed by a kernel extension of the client device. Additionally, disguising to the backup utility can comprise representing the remote device as a virtual block device. Based upon the representation, the backup utility permits the remote device to be selected as a valid backup destination and can send an instruction designating selected data for storage. At block 310, the designated data is identified for storage.

As previously discussed, it is possible that the remote device operates differently than the client device. For example, the client device can run a client operating system (e.g., Apple-based operating system) while the remote device runs a remote operating system (e.g., Windows-based operating system or other operating system). It is also possible that the client operating system and the remote operating system are incompatible with one another. If there is incompatibility, the designated data is transformed/converted from the format of the client device to the format of the remote device (block 315). In one embodiment, transforming the data comprises converting the data from a logical block address format to a file offset format.

At block 320, the transformed data is transmitted to the remote device to cause the remote device to retain the transformed data. Therefore, the methodology 300 allows a backup utility to retain backup data remotely.

Figure 4:
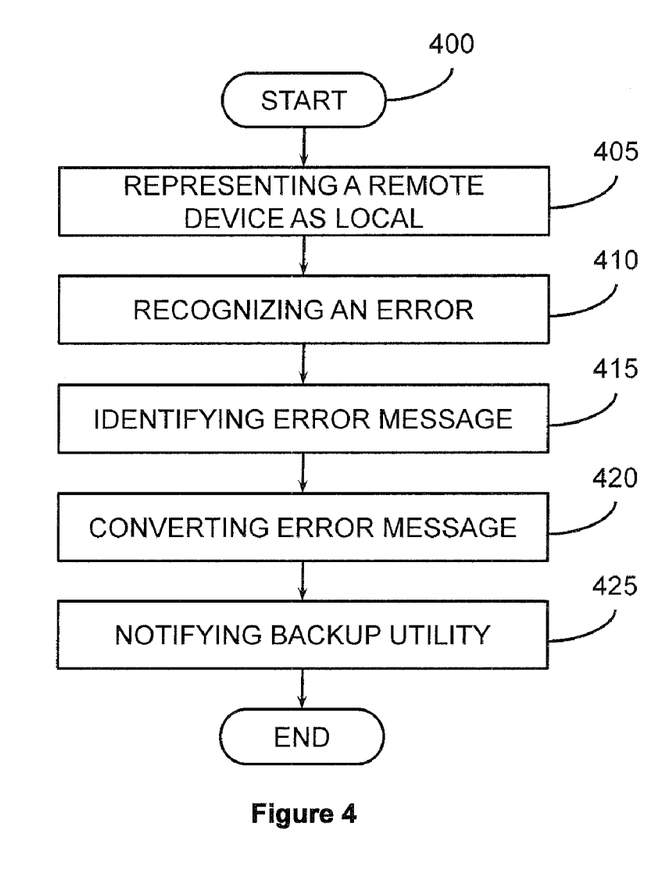
FIG. 4 illustrates one embodiment of an error management methodology.

FIG. 4 illustrates an embodiment of a methodology 400 for processing an error related to remote storage when the remote storage is represented as a local device. As described above, a backup utility configured to save backup data locally can be tricked into believing the remote device is local (e.g., is a USB connected drive, etc). Therefore, the backup utility is caused to retain backup data remotely. However, an error can occur in relation to a remote storage operation. For example, the remote device can lose a network connection and backup data is not able to be stored at the designated device. Since the backup utility is not aware that the selected backup device is remote, a problem could occur if the backup utility is notified with a network-type error message (e.g. that a network connection is lost). The following example will be described where the client device is running a client operating system and the remote server device is running a server operating system.

Therefore, the methodology 400 includes modifying the network related error message to a local device error message. The error message is made consistent with the representation that the remote device is local. For example, when the network connection is lost, an error message can be supplied to the backup utility that a USB connected drive was unplugged.

At block 405, the method represents a remote server device as a local device as previously described. Subsequently, an error associated with the remote server device occurs and is recognized (block 410). A check can occur to determine if the error is based on a remote characteristic. If the error is not based on a remote characteristic (e.g., loss of power), then the backup utility can be notified of the error. If the error is based on a remote characteristic, then the methodology 400 can continue. At block 415, an error message that corresponds to the recognized error is identified. In one embodiment, the error message is in a format consistent with the remote server device (e.g. based on the remote device's operating system).

At block 420, the error message is converted to a format consistent with the client device (e.g. where the error message appears as a local error message). According to one embodiment, a lookup table is used for converting error messages. At block 425, the backup utility is notified of the error associated with the remote server device via the converted error message. Since the converted error message appears as a local error message, the message is consistent with the representation to the backup utility that the remote server device is local to the client device. Thus, the notification does not undermine the representation that the remote device is a local device. In other words, the backup utility believes that the remote server device is a local device and the received error message, which has a local error message format, does not contradict the representation.

According to one embodiment, a determination is made if the identified error message undermines the representation as part of the identifying at block 415. Converting (block 420) and notifying (block 425) occur in response to a determination that the identified error message undermines the representation.

In one embodiment, the error logic 220 of FIG. 2 can perform the recognizing, identifying, and converting of the methodology 400. The representing can be performed by the emulation logic 120 of FIG. 1 while the transmitter 215 of FIG. 2 can perform the notifying. In another embodiment, a computer-readable medium storing computer-executable instructions is implemented that when executed by a computer cause the computer to perform the methodology 400, other methodologies, or their equivalents. Performing the methodology can strengthen a belief by the backup utility that the remote storage device is local.

Figure 5:
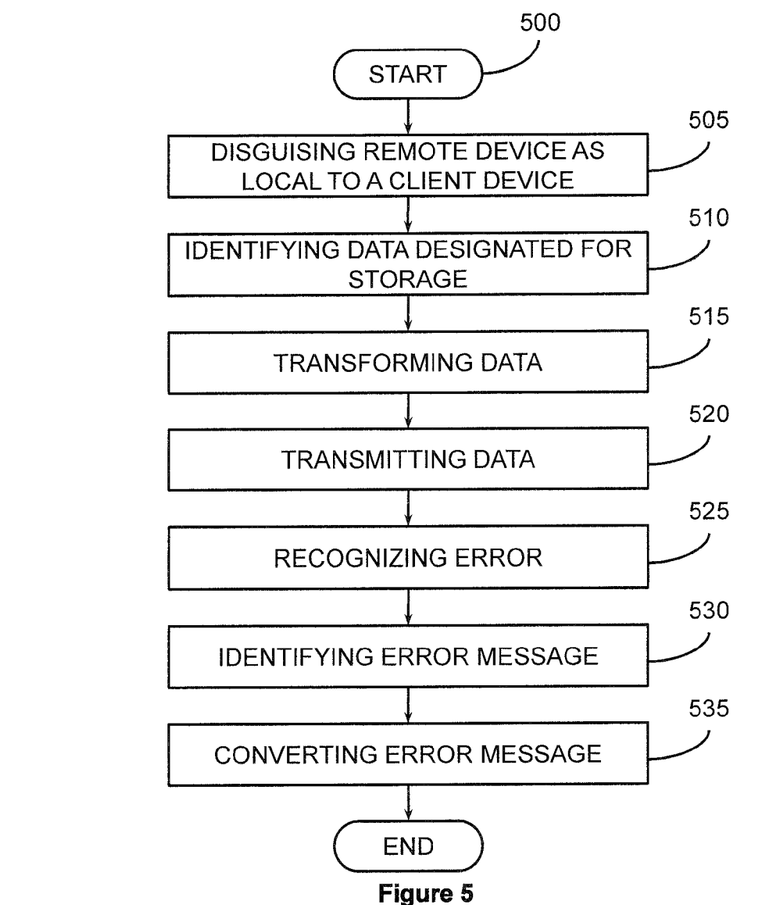
FIG. 5 illustrates one embodiment of a storage and error processing methodology.

FIG. 5 illustrates an embodiment of a methodology 500 for storing information and processing errors. At block 505, a remote device is disguised as a local device to a client device. Identifying data designated for storage by the backup utility can occur at block 510. According to one embodiment, the backup utility designates the data for storage on the remote device disguised to the backup utility as being local.

At block 515, the data designated for storage by the backup utility is transformed from a format of the client device to a format of the server device. The transformed data is then transmitted to the remote device to cause the remote device to retain the transformed data (block 520).

An error can be managed so that a belief held by the backup utility is not compromised. At block 525, an error associated with the remote server device is recognized. Identifying an error message that corresponds to the recognized error can occur at block 530. In one implementation, the error message is in a format compatible with the remote server device (e.g. a format based on the operating system of the remote server device). At block 535, the error message is converted to a format compatible with the client device (e.g. a format based on the operating system of the client device). This allows the converted error message to be accessible to the backup utility, which executes using the client operating system. Therefore, the backup utility does not become aware of the remote state of the remote device.

Figure 6:
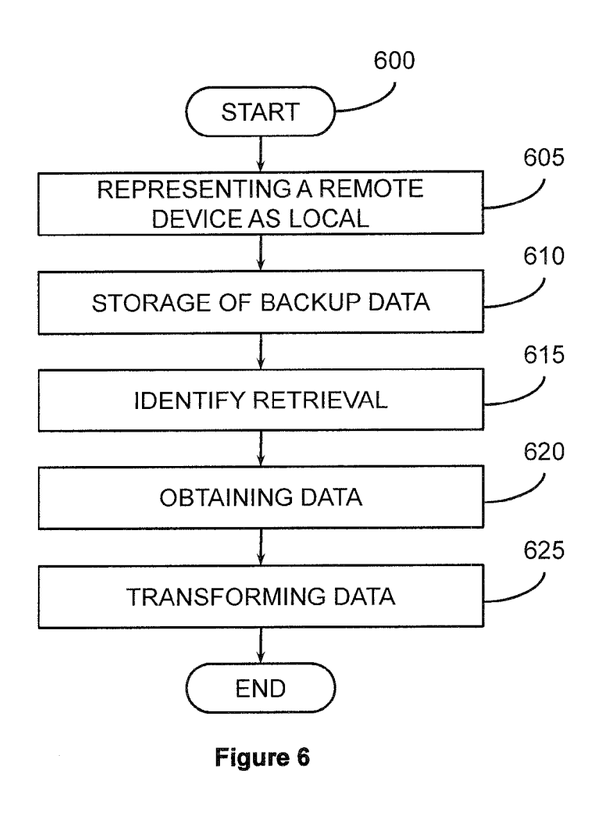
FIG. 6 illustrates one embodiment of a recovery methodology.

FIG. 6 illustrates an embodiment of a methodology 600 for performing a rollback operation to a previous version or state of a hard drive or other selected files/data. At block 605, a remote device can be represented to a backup utility as being local. Storage of backup data, via the backup utility, can occur at block 610. The storage can include operations of previously discussed blocks. For example, storage can occur in a manner consistent with FIG. 3.

At some point, an error or other event may occur where the hard drive is to be restored to a previous state or version (e.g. a rollback). The method identifies that a rollback is to be performed and identifies backup data/information that should be retrieved from remote storage (block 615). The identification can be made from an instruction of the backup utility. The backup data is then obtained (block 620) and transformed back to a format usable by the backup utility (block 625). For example, the transforming may include converting the data from file offset format to virtual/logical block address format. Therefore, the backup utility can fully use remote storage without being aware that the storage is remote.

While example systems, methods, and so on have been illustrated by describing examples, and while the examples have been described in considerable detail, it is not the intention of the applicants to restrict or in any way limit the scope of the claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A system comprising:
one or more hardware resources comprising:
emulation logic configured to cause a backup utility to identify a remote device as being local to a client device;
conversion logic configured to: (i) in response to an instruction from the backup utility to retain backup data, determine whether a format for the backup data used for local storage at the client device is compatible with a format used for storage at the remote device, and (ii) in response to determining that the formats are incompatible, translate the backup data from the format used for local storage at the client device to the format used for storage at the remote device;
storage logic configured to cause the backup data to be retained on the remote device identified by the backup utility as being local; and
error logic configured to (i) recognize an error associated with the remote device, (ii) identify an error message that corresponds to the recognized error, wherein the error message is in a format compatible with the remote device, and (iii) convert the error message to a format compatible with the client device to enable the client device to identify the converted error message as being local to the client device;
wherein the conversion logic is further configured to translate the backup data from the format used for storage at the remote device to the format used for local storage at the client device when the client device is to be restored to a previous state using the backup data.

2. The system of claim 1, where the emulation logic, the conversion logic, or the storage logic are part of a kernel of the client device.

3. The system of claim 2, where the emulation logic, the conversion logic, or the storage logic are part of a kernel extension of the kernel.

4. The system of claim 1, where the conversion logic modifies the backup data from a logical block address format to a file offset format as at least part of the translation.

5. The system of claim 1, wherein the one or more hardware resources comprises analysis logic configured to process the instruction from the backup utility to retain backup data, wherein a result of the process is used to control operation of the storage logic.

6. A computer-implemented method, the method being performed by one or more processors of a computing device and comprising:
identifying a remote device as being a local device;
identifying backup data designated for storage on the remote device that is identified as being a local device;
determining whether a format for the backup data used for local storage at the computing device is compatible with a format used for storage at the remote device;

in response to determining that the formats are incompatible, transforming the backup data designated for storage from the format used for local storage at the computing device to the format used for storage at the remote device;
transmitting the transformed backup data to the remote device to cause the remote device to retain the transformed backup data;
recognizing an error associated with the remote device;
identifying an error message that corresponds to the recognized error, wherein the error message is in a format compatible with the remote device;
converting the error message to a format compatible with the computing device to enable the computing device to identify the converted error message as being local to the computing device; and
when the computing device is to be restored to a previous state using the backup data, translating the backup data from the format used for storage at the remote device to the format used for local storage at the computing device.

7. The method of claim 6, wherein the computing device runs a client operating system, wherein the remote device runs a remote operating system, and wherein determining whether the format for the backup data used for local storage at the computing device is compatible with the format used for storage at the remote device includes determining that the client operating system and the remote operating system are incompatible with one another.

8. The method of claim 6, wherein identifying a remote device as being a local device is performed by a kernel extension of the computing device.

9. The method of claim 6, wherein transforming the backup data designated for storage comprises converting the backup data from a logical block address format to a file offset format.

10. The method of claim 6, wherein identifying a remote device as being a local device comprises representing the remote device as a virtual block device.

11. The method of claim 6, wherein transmitting the transformed backup data to the remote device is performed via a transmitter and an antenna.

12. A non-transitory computer-readable medium storing computer-executable instructions that, when executed by a processor of a computing device, cause the processor to perform a method, the method comprising:
representing a remote server device running a server operating system as being local to the computing device;
identifying backup data designated for storage on the remote server device that is represented as being local to the computing device;
determining whether a format for the backup data used for local storage at the computing device is compatible with a format used for storage at the remote server device;
in response to determining that the formats are incompatible, transforming the backup data designated for storage from the format used for local storage at the computing device to the format used for storage at the remote server device;
transmitting the transformed backup data to the remote device to cause the remote device to retain the transformed backup data;
recognizing an error associated with the remote server device;
identifying an error message that corresponds to the recognized error, wherein the error message is in a format compatible with the remote server device;
converting the error message to a format compatible with the computing device to enable the computing device to identify the converted error message as being local to the computing device; and
when the computing device is to be restored to a previous state using the backup data, translating the backup data from the format used for storage at the remote device to the format used for local storage at the computing device.

13. The non-transitory computer-readable medium of claim 12, wherein the error is a loss of connection to the remote server device.

14. The non-transitory computer-readable medium of claim 12, wherein the server operating system is a Windows-based operating system.

* * * * *

UNITED STATES PATENT AND TRADEMARK OFFICE
CERTIFICATE OF CORRECTION

| | | |
|---|---|---|
| PATENT NO. | : 8,370,681 B2 | Page 1 of 1 |
| APPLICATION NO. | : 12/477414 | |
| DATED | : February 5, 2013 | |
| INVENTOR(S) | : David H. Hanes | |

It is certified that error appears in the above-identified patent and that said Letters Patent is hereby corrected as shown below:

In the Claims

In column 10, line 23, in Claim 12, delete "identifing" and insert -- identifying --, therefor.

Signed and Sealed this
Fourth Day of June, 2013

Teresa Stanek Rea
*Acting Director of the United States Patent and Trademark Office*